US012103746B2

(12) United States Patent
Hoffmann et al.

(10) Patent No.: US 12,103,746 B2
(45) Date of Patent: Oct. 1, 2024

(54) BETA CONTAINER FOR AN ALPHA-BETA PORT SYSTEM

(71) Applicant: castus Gmbh & Co. KG, Ochsenhausen (DE)

(72) Inventors: Jürgen Hoffmann, Ochsenhausen (DE); Andreas Mayer, Ingoldingen (DE)

(73) Assignee: castus GmbH & Co. KG (DE)

( * ) Notice: Subject to any disclaimer, the term of this patent is extended or adjusted under 35 U.S.C. 154(b) by 302 days.

(21) Appl. No.: 17/675,175

(22) Filed: Feb. 18, 2022

(65) Prior Publication Data

US 2022/0258934 A1 Aug. 18, 2022

(30) Foreign Application Priority Data

Feb. 18, 2021 (DE) ..................... 10 2021 201 569.7

(51) Int. Cl.
*B65D 51/24* (2006.01)
*B01L 1/02* (2006.01)
(Continued)

(52) U.S. Cl.
CPC .............. *B65D 51/245* (2013.01); *B01L 1/02* (2013.01); *B65D 25/20* (2013.01); *B65D 35/02* (2013.01);
(Continued)

(58) Field of Classification Search
CPC ...... B65D 51/245; B65D 35/44; B65D 53/02; B65D 2203/10; B65D 2251/205;
(Continued)

(56) References Cited

U.S. PATENT DOCUMENTS 4,955,493 A * 9/1990 Touzani ............... B65D 1/0292 220/666
5,186,563 A * 2/1993 Gebhard ................ B65D 47/42 401/164
(Continued)

FOREIGN PATENT DOCUMENTS

DE 10 2016 004200 A1 10/2017
EP 1 331 174 A1 7/2003
EP 2 242 004 A1 10/2010
EP 3 347 127 A1 7/2018

OTHER PUBLICATIONS

European Patent Office; Office Action in related European Patent Application No. 22156917.1 dated Sep. 27, 2023: 8 pages.
European Patent Office: Search Report in related European Patent Application No. 22156917.1 dated Jun. 29, 2022; 9 pages.

*Primary Examiner* — Frederick C Nicolas
(74) *Attorney, Agent, or Firm* — Dorton & Willis, LLP

(57) ABSTRACT

A beta container for an alpha-beta port system includes a sheath for receiving transport material and a flange part having a through opening for transferring the transport material from and/or into the sheath, a first interface for a reversible connection to an alpha connection of the port system, and a second interface for releasable attachment of a beta cover for closing the through opening. An edge of the sheath is connected with a first surface of a ring which encompasses a jacket surface of the flange part, the first surface and the jacket surface having different materials. An elastic bellows may be fastened to the flange part such that, in the relaxed state, it engages over the second interface and/or projects out of the through-opening on the side facing away from the sheath, and such that it can be compressed. At least one transponder for transmitting an identification may be arranged on the flange part.

23 Claims, 5 Drawing Sheets

(51) Int. Cl.

| | |
|---|---|
| ***B65D 25/20*** | (2006.01) |
| ***B65D 35/02*** | (2006.01) |
| ***B65D 35/44*** | (2006.01) |
| ***B65D 53/02*** | (2006.01) |
| *B65B 3/00* | (2006.01) |
| *B65B 7/14* | (2006.01) |

(52) U.S. Cl.
CPC ............. *B65D 35/44* (2013.01); *B65D 53/02* (2013.01); *B01L 2200/025* (2013.01); *B01L 2200/0689* (2013.01); *B01L 2200/141* (2013.01); *B01L 2300/022* (2013.01); *B01L 2300/042* (2013.01); *B65B 3/003* (2013.01); *B65B 7/14* (2013.01); *B65D 2203/10* (2013.01); *B65D 2251/205* (2013.01)

(58) Field of Classification Search
CPC ........ B65D 35/02; B65D 25/20; B65B 3/003; B65B 7/14; B01L 3/563; B01L 1/02; B01L 2200/025; B01L 2200/0689; B01L 2200/141; B01L 2300/022; B01L 2300/042
See application file for complete search history.

(56) References Cited

U.S. PATENT DOCUMENTS

| | | | | |
|---|---|---|---|---|
| 5,301,850 | A * | 4/1994 | Gueret | B05B 11/1057 222/491 |
| 5,853,207 | A | 12/1998 | Saint Martin et al. | |
| 6,827,242 | B2 * | 12/2004 | Semenenko | B65G 69/183 222/509 |
| 7,322,918 | B2 * | 1/2008 | Matsumura | B65D 83/0072 493/104 |
| 8,276,755 | B2 * | 10/2012 | Matsumura | B65D 35/12 206/524.1 |
| 8,550,300 | B2 * | 10/2013 | Lee | B05B 11/00444 222/105 |
| 9,416,882 | B2 * | 8/2016 | Miura | F16K 1/2042 |
| 9,545,628 | B2 * | 1/2017 | Armau | B01L 3/54 |
| 10,722,892 | B2 * | 7/2020 | Eccles | B01L 1/025 |
| 10,843,184 | B2 * | 11/2020 | Pallares | B25J 21/02 |
| 2012/0219388 | A1 | 8/2012 | Armau | |
| 2018/0369801 | A1 | 12/2018 | Pallares et al. | |
| 2019/0092582 | A1 * | 3/2019 | Sümmermann | B65D 53/02 |

* cited by examiner

BETA CONTAINER FOR AN ALPHA-BETA PORT SYSTEM

CROSS-REFERENCE TO RELATED APPLICATIONS

This application claims the benefit of priority under 35 U.S.C. § 119(a) to German Patent Application 10 2021 201 569.7, filed Feb. 18, 2021 (pending), the disclosure of which is incorporated by reference in its entirety.

TECHNICAL FIELD

The present invention relates to a beta container for an alpha-beta port system, an alpha-beta port system comprising the beta container, a use of the beta container, and a method of manufacturing the beta container.

BACKGROUND

Alpha-beta port systems (also known as “rapid transfer ports”) are basically known and they are used for transferring material quickly and without contamination from a container, the beta container, into an insulating chamber and/or from the insulating chamber into the container.

The so-called alpha port has an alpha connection and an alpha door, the beta container has a flange part for connection to the alpha port (of the isolation chamber). A beta cover for closing the beta container can be detachably fastened to the flange part, which cover is connected to the alpha door after connection of the beta container or the flange part to the alpha connection and it is detached from or transferred to the beta container so that it can be opened together with the latter, the non-sterile end face of the beta cover being covered by the alpha door.

SUMMARY

An object of one embodiment of the present invention is to provide an advantageous alpha-beta port system and/or an advantageous beta container therefor and/or to improve the manufacturing thereof.

This problem is solved by a beta container, an alpha-beta port system comprising one or more beta containers described herein, a use of a beta container described herein, and/or a method of manufacturing the same, respectively.

According to one embodiment of the present invention, a beta container for a, in particular one, alpha-beta port system(s) comprises a sheath which accommodates the transport material, in one embodiment the transport goods, or which is set up or used for this purpose.

In one embodiment, the sheath is flexible. In one embodiment, this can improve the handling. In another embodiment, the sheath is rigid. This may, in one embodiment, protect the contents thereof. In one embodiment, the sheath is closed, in particular hermetically sealed, except for its edge mentioned below or its connection to the flange part mentioned below.

According to one embodiment of the present invention, the beta container comprises a flange part having a through opening for transferring the transport material from the and/or into the sheath, a first interface for a reversible connection to an alpha connection of the alpha-beta port system, and a second interface for releasably attaching a beta cover for closing the through opening.

In one embodiment, the first and/or second interfaces are (each) a bayonet locking interface. In one embodiment, this allows the flange part to be attached to the alpha connection or to the alpha port or the beta cover to be attached to the flange part in a particularly secure, simple and/or quick manner.

According to one aspect of the present invention, an edge of the sheath is will be or in a material-fitting manner connected to a, preferably radially outer, surface of a ring, referred to herein without limitation of generality as the first surface, which embraces a jacket surface of the flange part, in a further embodiment welded. In one embodiment, the edge of the sheath is or will be in a material-fitting manner connected to the first surface of the ring over the entire circumference of the ring and/or over an axial width of at least 5 mm, and/or the first surface of the ring is a surface facing away from or radially outer than the circumferential surface, and/or the sheath covers the ring over at least 50%, preferably at least 90%, of the first surface. In one embodiment, the ring is or will be connected to the flange part, in particular the jacket surface of the flange part, in a form-fitting manner and/or in a material-fitting manner, preferably via or by means of the first seal(s) explained below. In particular, for this purpose, in one embodiment, the first surface and/or the jacket surface has one or more shoulders, preferably at least one recess, preferably an annular groove, and/or at least one, preferably circumferential, projection. Thus, in one embodiment, the tightness and/or the connection between the sheath and the flange part can be improved.

According to one embodiment of the present invention, the first surface (of the ring) and the jacket surface (of the flange part) comprise different materials, and in one embodiment, the first surface and the jacket surface, in a further embodiment the ring and the flange part, comprise different materials.

In one embodiment, this enables a particularly advantageous connection of the sheath to the flange part, in particular if the sheath (edge) material cannot be welded to the jacket surface, in particular if it cannot be connected to the jacket surface in a in a material-fitting manner, or if it can only be connected to the jacket surface with difficulty, and at the same time an optimum choice of material for the sheath and the flange part, in particular a (better) sterilizable, in particular autoclavable, flange part or the like can be enabled.

According to a further aspect of the present invention, which is particularly advantageously combined with the aspect of the ring, but which can also be realized independently thereof, there is or will be attached to the flange part, preferably in the through opening, an elastic bellows such that in a relaxed state it overlaps the second interface and/or protrudes from the through opening on the side facing away from the sheath and such that, in one embodiment, it is compressible by or compressed by a beta cover attached to the second interface and/or onto an sheath facing side of the second interface.

Thus, in one embodiment, the bellows initially compressed by the cover attached to the second interface automatically relaxes beyond the second interface and/or out of the through opening, preferably out of the flange part and/or beyond a sheath remote outer end face of the flange part, upon or through or after opening the cover.

Thus, in one embodiment, the transport material can advantageously be better protected during the transfer.

According to a further aspect of the present invention, which is particularly advantageously combined with the aspect of the ring and/or with the aspect of the bellows, but which can also be realized independently thereof, at least one, in one embodiment passive, transponder which transmits an identification or which is set up or used for this purpose, preferably an RFID transponder or the like, is or will be arranged at, in one embodiment in, the flange part.

By this, in one embodiment, the handling of the beta container can be improved, in particular its logistics and/or its safety. By being arranged in the flange part or under an outer surface of the flange part, in one embodiment, the transponder can be particularly well protected.

In one embodiment, a seal, which is referred to herein without limitation of generality as the first seal, is arranged between the ring, in particular an inner circumferential surface of the ring, and the jacket surface. In a further embodiment, the seal is or will be in a form-fitting manner and/or in a material-fitting manner connected to the ring, in particular to the inner circumferential surface, and/or in a form-fitting manner and/or in a material-fitting manner connected to the jacket surface (of the flange part), in one embodiment during manufacture of the seal, in particular by injection or injection molding or the like.

In one embodiment, this can improve the tightness and/or the connection between the sheath or the ring and the flange part.

In one embodiment, the jacket surface (of the flange part) and the first seal have different materials, in one embodiment the jacket surface, and in a further embodiment the flange part, and the first seal consist of different materials. In addition, or alternatively, in one embodiment at least one surface, in particular the first surface and/or an inner circumferential surface opposite the jacket surface, of the ring on the one hand and the first seal on the other hand have different materials, and in one embodiment the at least one surface of the ring, in particular the first surface and/or inner circumferential surface, and in a further embodiment the ring, and the seal are made of different materials.

This can advantageously improve a seal of the container, and in a further embodiment, different thermal expansions of the ring and the flange part can be compensated.

In one embodiment, on a side of the second interface of the flange part facing away from the sheath, preferably on a front side of the flange part facing away from the sheath, there is or will be arranged a seal, referred to herein without limitation of generality as a second seal, which seals a beta cover attached to the second interface, and in one embodiment, which engages around it, or which is set up for this purpose. Preferably, the second seal is arranged on an inner circumferential surface of the flange part.

In one embodiment, this allows the transport material to be better protected during the transfer.

In one embodiment, the second seal is or will be connected to the first seal, in particular by one or more webs distributed over the circumference, and in a further embodiment produced together with this or these, preferably by injection or injection molding or the like.

Thus, in one embodiment, the manufacture can be improved and/or the first seal and the second seal can be secured.

In one embodiment, the or one or more of the web(s) each extends through a channel of the flange part.

Thus, in one embodiment, the fabrication can be improved and/or the web(s) can be protected.

In a preferred embodiment, the transponder is or will be arranged in the first seal, the second seal or, particularly preferably, in the or one of the web(s) and/or a channel of the flange part, preferably in the web extending through a channel of the flange part or in one of the webs extending through a channel of the flange part, preferably molded in during the manufacturing of the web, together with the first and/or second seal.

In this way, in one embodiment, the transponder can be protected very particularly well.

In one embodiment, the bellows is or will be fixed in the through opening by means of a, preferably annular, connecting body in a frictionally manner and/or in a form-fitting manner and/or in a material-fitting manner.

Thus, in one embodiment, the attachment of the bellows can be improved, in particular it can be simplified and/or its reliability can be increased.

In one embodiment, the flange part has a higher heat deflection temperature according to DIN EN ISO 75-1, -2, -3 than the ring and/or the cover.

Additionally, or alternatively, in one embodiment, the jacket surface of the flange part and one or the inner peripheral surface of the ring opposite thereto, preferably the flange part and the ring, are not weldable to each other or they are made of materials that are not weldable to each other.

Additionally, or alternatively, in one embodiment, the flange part, in particular its jacket surface, and/or the connecting body and/or the beta cover (respectively) comprise polycarbonate (PC) or the like, and in a further embodiment, the jacket surface, in particular the flange part, and/or the connecting body and/or the beta cover consists thereof.

Additionally, or alternatively, in one embodiment, the ring, in particular its first surface and/or inner circumferential surface opposite the jacket surface, and/or the cover, in particular its edge, comprises (in each case) polyethylene (PE) or the like, preferably PE-HD or PE-EVOH-PE or the like, and in a further embodiment, the first surface and/or inner circumferential surface, in particular the ring, and/or the edge, in particular the sheath, consists thereof. In a further embodiment, the sheath may additionally or alternatively comprise a Tyvek film or the like.

Additionally, or alternatively, in one embodiment, the first seal and/or the second seal and/or the bellows and/or the web(s) in each case have EPDM or, particularly preferably, silicone or the like, and in a further embodiment, the first seal and/or the second seal and/or the bellows and/or the web(s) consist(s) thereof.

Hereby, in one embodiment, the flange part and the beta cover can be sterilized particularly well and/or the connection to the alpha connection or the fastening of the cover can be improved and, additionally or alternatively, particularly advantageous, in particular inexpensive and/or flexible, sheathes can be used and/or the sealing and/or the connection between the ring surface and the seal or the seal and the jacket surface of the flange part can be improved.

According to one embodiment of the present invention, one or more alpha-beta port systems comprise one or preferably more beta containers as described herein and one or more alpha ports with (each) a mating interface for reversibly connecting said one or more beta containers via its first interface.

According to one embodiment of the present invention, a beta container described herein is used or is provided, in particular arranged, for a sterile transfer of the material from the container interior into an isolation space of one or more alpha-beta port systems and/or from the isolation space into the container interior.

In one embodiment, an identification is transmitted from the transponder, which in one embodiment can improve the logistics and/or the security.

Additionally, or alternatively, the beta container or its flange part is reversibly connected to an alpha connection or the alpha port of the alpha-beta port system via its first interface and its beta cover is connected to an alpha door of the alpha port and opened.

In one embodiment, the transmitting of the identification from the transponder occurs prior to the connecting, which in one embodiment can improve the logistics. Additionally, or alternatively, in one embodiment, the transmitting of the identification from the transponder occurs during the connecting, whereby in one embodiment the security can be improved. Additionally, or alternatively, in one embodiment, the transmitting of the identification from the transponder occurs after the connecting, whereby in one embodiment the logistics and/or the security can be (further) improved.

Additionally, or alternatively, in one embodiment, preferably as a result of such an opening, the bellows relaxes and thereby preferably protrudes from the through opening and/or overlaps the second interface.

According to one embodiment of the present invention, a method of manufacturing a beta container described herein comprises the step of: connecting the edge of the sheath to the ring in a material-fitting manner, and, in one embodiment, connecting the ring and the flange part in a form-fitting manner and/or in a material-fitting manner and/or, preferably thereto or by, arranging, preferably manufacturing, the first seal between the jacket surface and the ring, in one embodiment together with the second seal and optionally the web(s), in particular with the transponder being injected in.

In a further embodiment, the edge of the sheath is connected to the ring (which is still) spaced from the flange part, in one embodiment facilitating the handling of the sheath and the ring. In another further embodiment, the edge of the sheath is connected with the ring already connected to the flange part, which in one embodiment can improve the connecting.

Additionally, or alternatively, in one further embodiment, the first seal, in one embodiment together with the second seal and optionally the web(s), in particular with the transponder being molded in, is arranged, and in particular manufactured, between the jacket surface and the ring before or after the ring is connected to the edge of the sheath in a material-fitting manner.

According to one embodiment of the present invention, a or the method of manufacturing of a beta container described herein comprises the step of: attaching the bellows to the flange part, preferably in the through opening, and in a further embodiment compressing the bellows attached in the through opening by the cover attached to the second interface.

According to one embodiment of the present invention, the method of manufacturing a beta container described herein comprises the step of: arranging the at least one transponder at, in particular in, the flange part, in particular in the channel and/or before manufacturing the web.

In one embodiment, the flange part of the beta container is (manufactured) in one piece. In one embodiment, this can improve the stability and/or the tightness. In another embodiment, it is multi-part or multi-piece. In other words, the term flange part does not necessarily imply a one-piece component.

In one embodiment, the beta container is intended for, in particular configured for, or used for a single use (“single use”). Thus, in one embodiment, in particular the sheath can be optimized, in particular with respect to the weight, the fatigue strength or the like. In another embodiment, the beta container is provided for a multiple use or a reuse, and in particular it is set up or used for this purpose. Thus, in one embodiment, the environment can be conserved.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
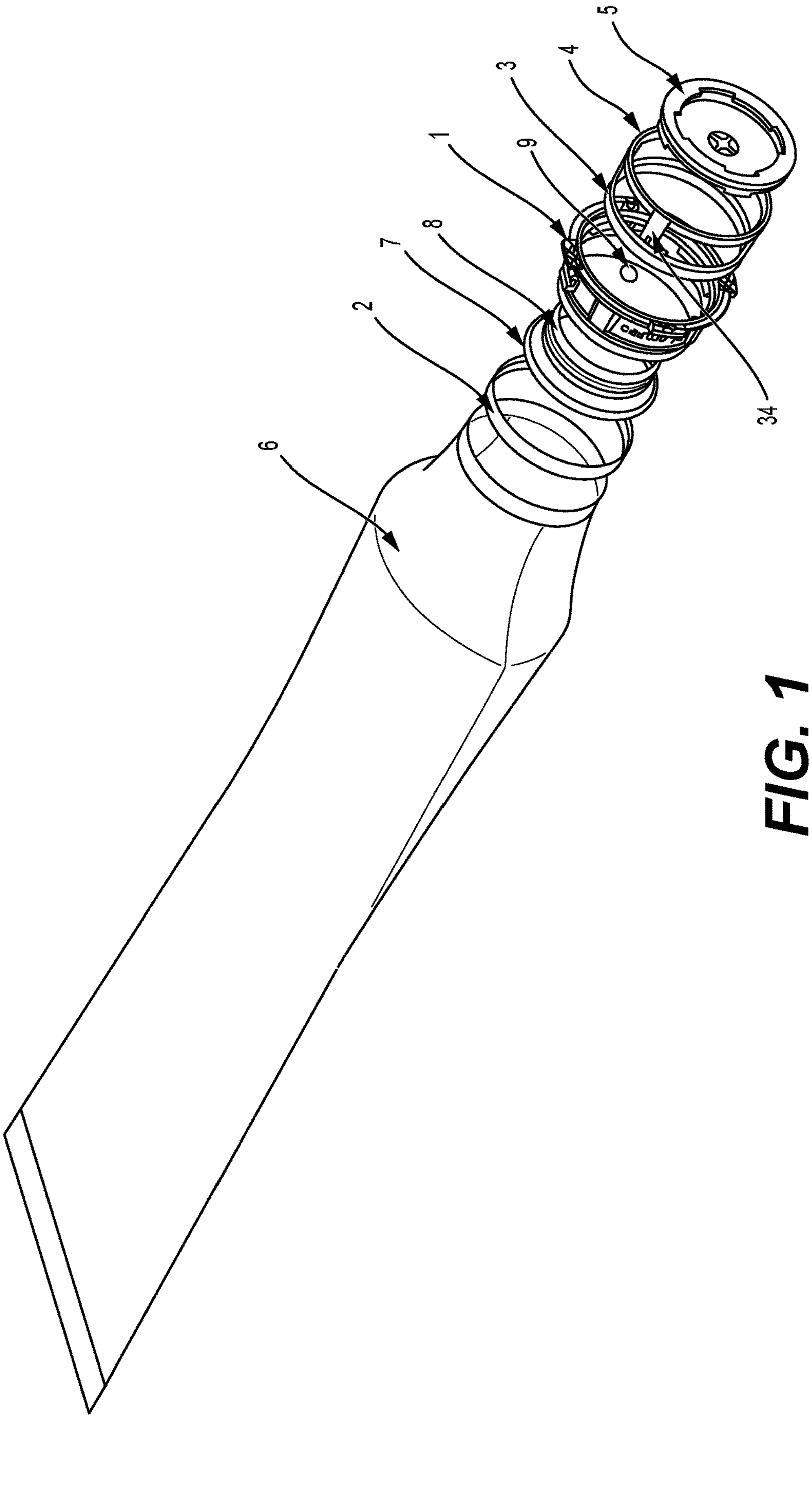
FIG. 1 is an exploded view of a beta container according to one embodiment of the present invention.

FIG. 1 shows an exploded view of a beta container according to one embodiment of the present invention, comprising

- a flange part 1, which has a first interface 1.1 for a reversible connection to an alpha connection 10 of an alpha-beta port system in a manner known per se, and a through opening 1.3,
- a sheath 6, the edge 6.1 of which is or will be welded to a first surface 2.1 of a ring 2,
- a first seal 3, which is or will be arranged between an inner circumferential surface 2.2 of the ring 2 and a jacket surface 1.4 of the flange part 1 and thereby connects the jacket surface and the inner circumferential surface or the flange part and the ring with each other,
- a second seal 4 which is or will be manufactured together with the first seal,
- a beta cover 5, which is detachably fastened in a manner known per se by means of or to a second interface 1.2 of the flange part 1 or which is arranged for this purpose,
- an elastic bellows 8, which is fastened in the through opening via a connecting body 7, and
- an RFID chip 9 which is or will be molded into a web 34 connecting the first and second seals and arranged or made in a channel 1.34 of the flange part 1.

Figure 2:
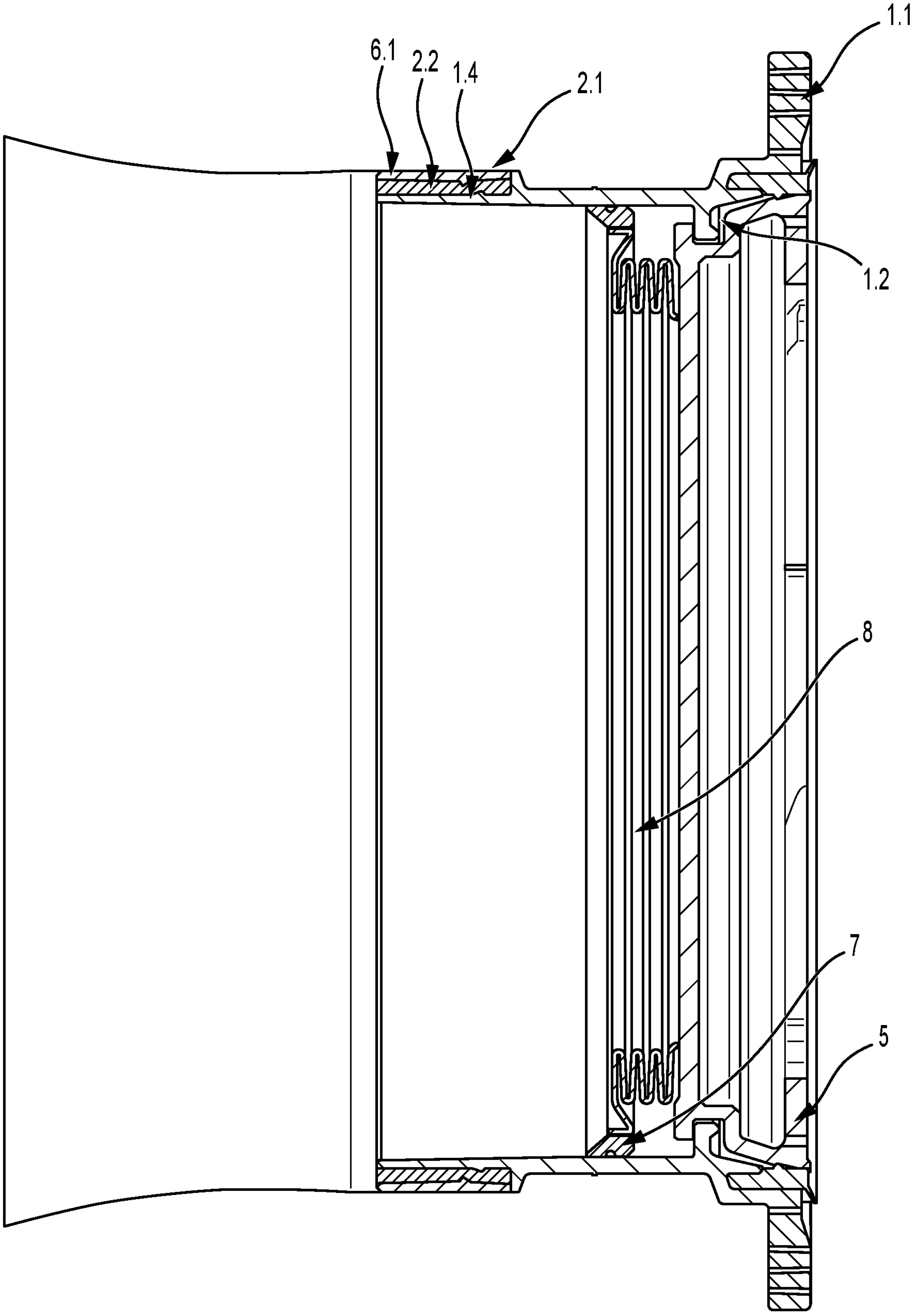
FIG. 2 illustrates a section through a flange part of the container with the beta cover attached and the bellows compressed.

FIG. 2 shows a section through the flange part of the container with the beta cover attached to the second interface, thereby compressing the bellows to a sheath facing side of the second interface (left in the FIG. 2).

Figure 3:
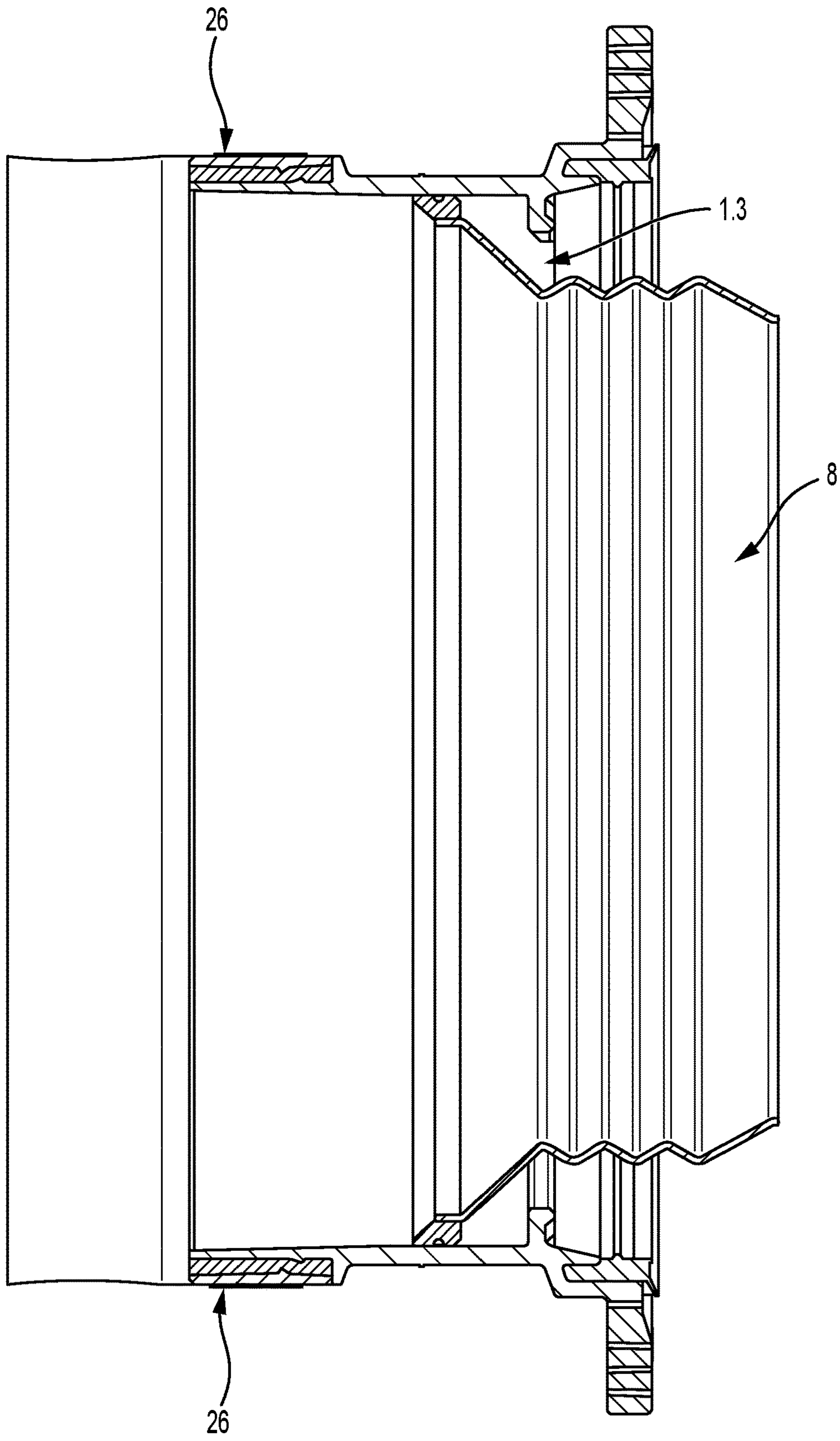
FIG. 3 illustrates the section of the FIG. 2 with the cover removed and the bellows relaxed.

FIG. 3 shows the section of the FIG. 2 with the cover removed. The bellows thus relaxed overlaps the second interface and protrudes from the through opening on the side facing away from the sheath (right in the FIG. 3).

In addition, a weld seam 26 is indicated between the sheath edge 6.1 and the ring surface 2.1 in the FIG. 3.

Figure 4:
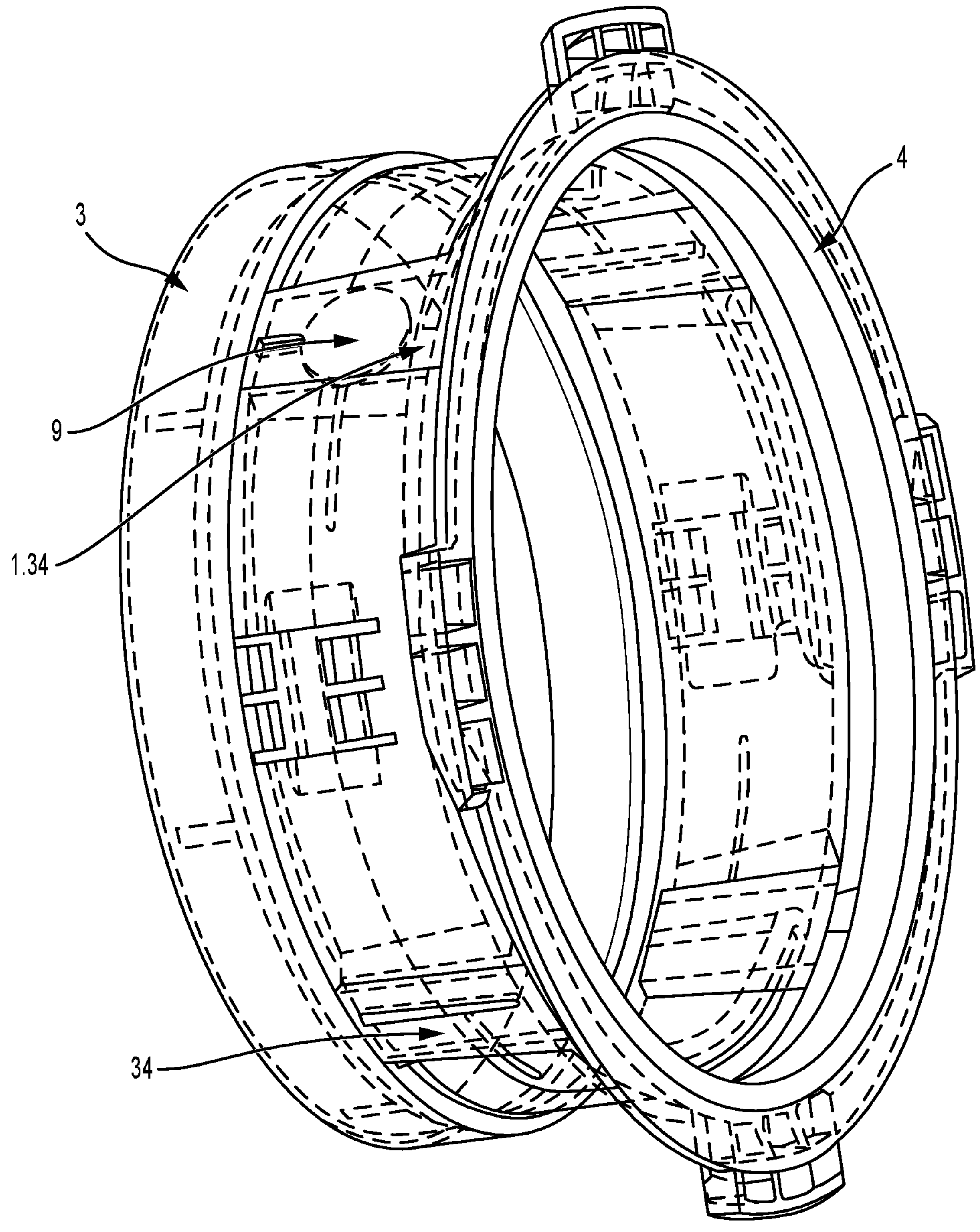
FIG. 4 is a perspective view of the flange part.
Figure 5:
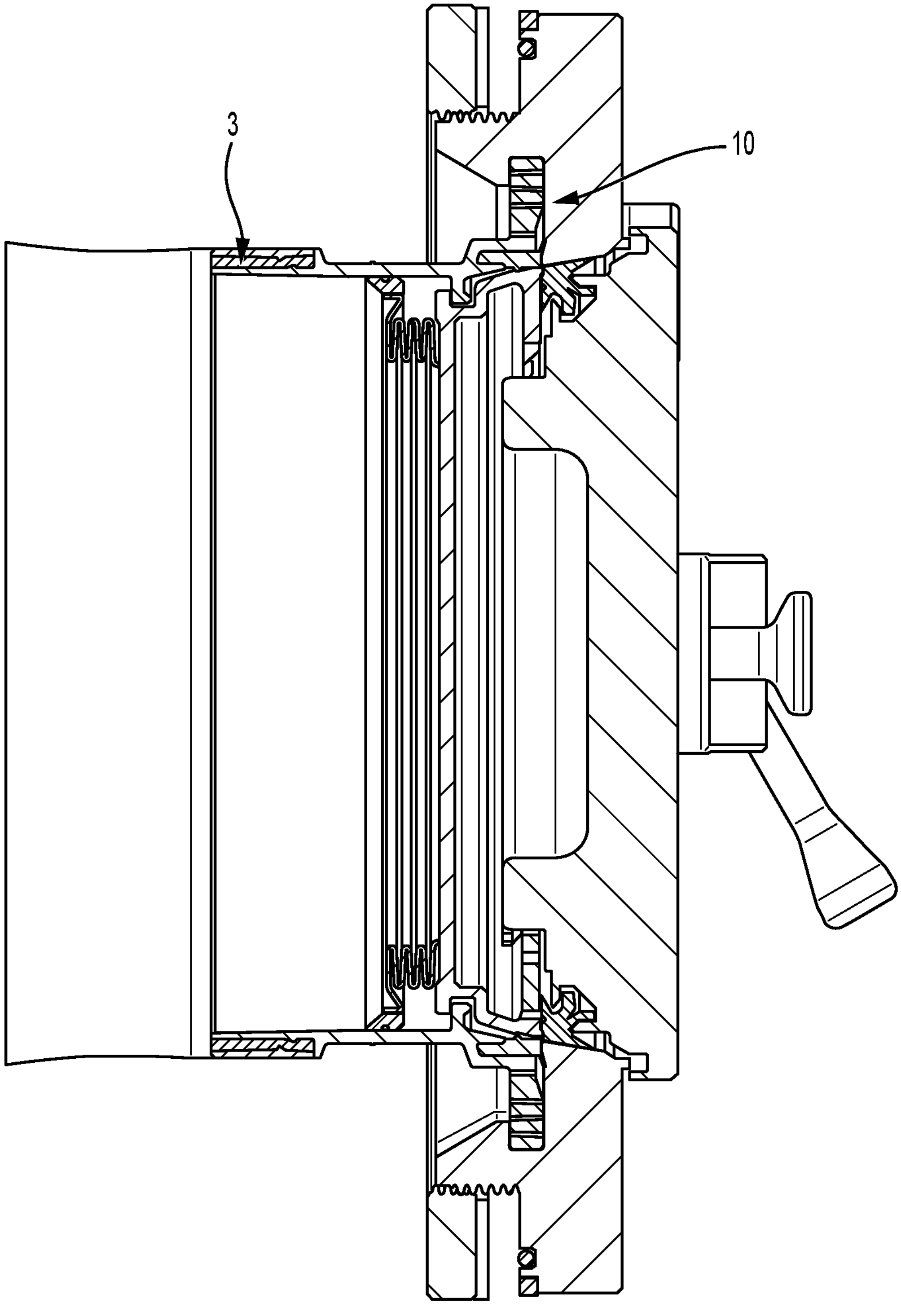
FIG. 5 illustrates an alpha-beta port system with the beta container according to one embodiment of the present invention.

In the perspective flange part view of the FIG. 4, the flange part is shown transparent to illustrate the first seal 3 and the second seal 4 as well as the four webs 34 connecting them and distributed over the circumference, with the RFID chip 9 being molded into one of the webs. For this purpose, silicone is injected in one shot so that the second seal 4 is produced at the same time, the RFID chip is fixed and the ring is connected to the flange part.

Although exemplary embodiments have been explained in the foregoing description, it should be noted that a variety of variations are possible. Furthermore, it should be noted that the exemplary embodiments are merely examples that are not intended to limit the scope of protection, the applications and the configurations in any way. Rather, the foregoing description provides the person skilled in the art with a guide for implementing at least one exemplary embodiment, wherein various modifications, particularly with respect to the function and the arrangement of the components described, may be made without departing from the scope of protection as it results from the claims and the equivalent feature combinations.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept

LIST OF REFERENCE SIGNS

1 flange part
1.1 first interface
1.2 second interface
1.3 through opening
1.4 jacket surface
1.34 channel
2 ring
2.1 first surface
2.2 inner circumferential surface
3 first seal
4 second seal
5 beta cover
6 sheath
6.1 edge
7 connecting body
8 bellows
9 transponder
10 alpha port
26 weld seam
34 web

What is claimed is:

1. A beta container for an alpha-beta port system, the beta container comprising:
a sheath for receiving a transport material; and
a flange part, the flange part comprising:
a through opening for transferring the transport material into or out from the sheath,
a first interface designed for reversible connecting to an alpha connection of the alpha-beta port system, and
a second interface designed for releasably attaching a beta cover that closes the through opening;
wherein at least one of:
an edge of the sheath is connected in a material-fitting manner to a first surface of a ring that encompasses around a jacket surface of the flange part, the first surface and the jacket surface comprising different materials, or
at least one transponder designed for transmitting an identification is arranged at the flange part.

2. The beta container of claim 1, further comprising a connecting body fixing the bellows in the through opening in at least one of a frictionally manner, a form-fitting manner, or a material-fitting manner.

3. The beta-container of claim 1, wherein at least one of:
the ring and the sheath are welded together;
the flange part has a higher heat distortion temperature according to DIN EN ISO 75-1, -2, -3 than at least one of the ring or the sheath;
the jacket surface of the flange part and an inner circumferential surface of the ring opposite thereto are not weldable to one another;
at least one of the flange part, the jacket surface of the flange part, or the beta cover comprises polycarbonate;
at least one of the ring, the first surface of the ring, or the sheath comprises polyethylene; or
the transponder is an RFID transponder.

4. The beta container of claim 2, wherein the connecting body comprises polycarbonate.

5. The beta container of claim 1, further comprising the beta cover detachably attachable to the second interface.

6. An alpha-beta port system, comprising:
at least one beta container according to claim 1; and
at least one alpha port having a mating interface for reversibly connecting the beta container via the first interface.

7. The beta container of claim 1, wherein an elastic bellows is fastened to the flange part in such a way that, in a relaxed state, the bellows is compressible and at least one of engages over the second interface or projects out of the through opening on a side facing away from the sheath.

8. The beta container of claim 7, wherein at least one of:
the sheath is flexible;
the elastic bellows is fastened to the flange part in the through opening;
the elastic bellows is compressible by the beta cover that is fastened to the second interface, or the elastic bellows is compressible to a side of the second interface facing toward the sheath;
the transponder is a passive transponder; or
the transponder is arranged in the flange part.

9. A beta container for an alpha-beta port system, the beta container comprising:
a sheath for receiving a transport material;
a flange part, the flange part comprising:
a through opening for transferring the transport material into or out from the sheath,
a first interface designed for reversible connecting to an alpha connection of the alpha-beta port system, and
a second interface designed for releasably attaching a beta cover that closes the through opening;
wherein an edge of the sheath is connected in a material-fitting manner to a first surface of a ring that encompasses around a jacket surface of the flange part, the first surface and the jacket surface comprising different materials; and
a first seal arranged between the ring and the jacket surface.

10. The beta container of claim 9, wherein:
the first seal is attached to at least one of the ring or the jacket surface; and the first seal is attached in at least one of a form-fitting manner or a material-fitting manner.

11. The beta container of claim 9, wherein at least one of:

at least one of the first seal and at least one surface of the ring, or the first seal and the sheath surface are formed from different materials;

a second seal is arranged on a side of the second interface facing away from the sheath in order to seal off a beta cover fastened to the second interface.

12. The beta container of claim 11, wherein at least one of:

the first seal and the first surface of the ring are formed from different materials;

the second seal is arranged on an inner circumferential surface of the flange part; or the second seal surrounds the beta cover fastened to the second interface.

13. The beta container of claim 11, wherein the second seal is connected to the first seal.

14. The beta container of claim 13, wherein at least one of:

the second seal is connected to the first seal by at least one web; or the second seal is formed together with the first seal.

15. The beta container of claim 14, wherein the at least one web extends through a channel of the flange part.

16. The beta container of claim 15, wherein the transponder is arranged in at least one of:

the first seal;

the second seal or the at least one web; or a channel of the flange part.

17. The beta container of claim 15, wherein the transponder is arranged in the channel of the flange part.

18. The beta container of claim 14, wherein at least one of the first seal, the second seal, the web, or the bellows comprises EPDM or silicone.

19. A method of sterilely transferring material from a container interior into or out from an isolation space of an alpha-beta port system, the method comprising:

obtaining beta container, wherein the beta container comprises:

a sheath for receiving a transport material, and a flange part, the flange part comprising:

a through opening for transferring the transport material into or out from the sheath, a first interface designed for reversible connecting to an alpha connection of the alpha-beta port system, and a second interface designed for releasably attaching a beta cover that closes the through opening, wherein at least one of:

an edge of the sheath is connected in a material-fitting manner to a first surface of a ring that encompasses around a jacket surface of the flange part, the first surface and the jacket surface comprising different materials, an elastic bellows is fastened to the flange part in such a way that, in a relaxed state, the bellows is compressible and at least one of engages over the second interface or projects out of the through opening on a side facing away from the sheath, or at least one transponder designed for transmitting an identification is arranged at the flange part; and at least one of:

transmitting an identification by the transponder, reversibly connecting the beta container via its first interface to an alpha port of the alpha-beta port system, connecting a beta cover of the beta container to an alpha door of the alpha port, and opening the beta cover, or relaxing the bellows such that the bellows at least one of overlaps the second interface or protrudes from the through opening.

20. The method of claim 19, wherein at least one of:

the beta container is connected to the alpha port before, during and/or after transmitting the identification by the transponder;

relaxing the bellows is caused by opening the beta cover.

21. A method of manufacturing a beta container for an alpha-beta port system, the beta container including a sheath coupled with a flange part, the flange part including a through opening for transferring a transport material into or out from the sheath, a first interface designed for reversible connecting to an alpha connection of the alpha-beta port system, and a second interface designed for releasably attaching a beta cover that closes the through opening, the method comprising at least one of:

connecting in a material-fitting manner an edge of the sheath to a ring that encompasses around a jacket surface of the flange part; or arranging at least one transponder at the flange part.

22. The method of claim 21, wherein at least one of:

the ring is spaced from or joined to the flange part;

a first seal is arranged between the jacket surface and the ring;

the first seal is formed between the jacket surface and the ring;

the at least one transponder is arranged in the flange part; or the at least one transponder is at least one of arranged in the flange part or arranged before producing a web that connects the second seal to the first seal.

23. The method of claim 22, wherein at least one of:

the first seal is at least one formed together with a second seal or formed before or after connecting the edge of the sheath to the ring; or the at least one transponder is arranged in a channel of the flange part.

* * * * *